(12) United States Patent
Khanna et al.

(10) Patent No.: US 7,366,891 B2
(45) Date of Patent: Apr. 29, 2008

(54) METHODS AND APPARATUS TO PROVIDE DUAL-MODE DRIVERS IN PROCESSOR SYSTEMS

(75) Inventors: Rahul Khanna, Beaverton, OR (US); Mallik Bulusu, Olympia, WA (US); Vincent Zimmer, Federal Way, WA (US); Michael A. Rothman, Puyallup, WA (US)

(73) Assignee: Intel Corporation, Santa Clara, CA (US)

( * ) Notice: Subject to any disclaimer, the term of this patent is extended or adjusted under 35 U.S.C. 154(b) by 379 days.

(21) Appl. No.: 11/027,520

(22) Filed: Dec. 30, 2004

(65) Prior Publication Data

US 2006/0168590 A1    Jul. 27, 2006

(51) Int. Cl.
*G06F 15/177* (2006.01)

(52) U.S. Cl. .......................... 713/2; 712/43
(58) Field of Classification Search .............. 713/2; 712/43
See application file for complete search history.

(56) References Cited

U.S. PATENT DOCUMENTS 5,974,544 A * 10/1999 Jeffries et al. ................. 713/1
6,654,875 B1 * 11/2003 Hartnett et al. ............. 712/211
6,988,163 B2 * 1/2006 Malueg et al. .............. 711/103

OTHER PUBLICATIONS

Extensible Firmware Interface Specification, Intel Corporation, Version 1.10, Dec. 1, 2002, 1084 pages.
Extensible Firmware Interface Specification, Version 1.10, Specification Update, Intel Corporation, Version -001, Nov. 26, 2003, 63 pages.

* cited by examiner

*Primary Examiner*—Thuan Du
(74) *Attorney, Agent, or Firm*—Hanley Flight & Zimmerman, LLC

(57) ABSTRACT

Methods and apparatus to provide dual-mode drivers in a processor system are disclosed. An example method disclosed herein comprises including operating system (OS) agnostic mode services that are available during an OS agnostic mode to allow a single set of drivers to be used during boot mode and the OS agnostic mode. The example method further comprises including a dual-mode library that is capable of determining the current operating mode of the processor system and binding the drivers to available services accordingly.

15 Claims, 7 Drawing Sheets

METHODS AND APPARATUS TO PROVIDE DUAL-MODE DRIVERS IN PROCESSOR SYSTEMS

TECHNICAL FIELD

The present disclosure relates generally to processor systems and, more particularly, to methods and apparatus to provide dual-mode drivers in processor systems.

BACKGROUND

Modern processor systems include several operating modes, such as, for example, boot mode, operating system (OS) mode, and OS agnostic mode. In general, a processor system enters the boot mode at the time that the power is initially applied. Following the boot mode, the system enters the OS mode, in which the system will generally remain until the processor system is turned off. At any time during the boot mode or the OS mode the system may switch to the OS agnostic mode. These three operating modes are described in further detail below.

Boot mode refers to the duration of time between when the system is initially powered on and the time that the OS takes control. Examples of boot modes include the basic input output system (BIOS) and the extensible firmware interface (EFI). During the boot mode, the firmware instructions of the processor system are in control of the processor system. To allow the firmware instructions to communicate with any attached hardware components (e.g., keyboard, hard drive, floppy drive, etc.), the processor system includes firmware instructions known as drivers. Drivers are generally stored in system memory such as, for example, flash memory, random access memory (RAM), read only memory (ROM), etc. During the boot mode, the drivers are loaded into memory and used to translate requests from the processor system into commands that the hardware components understand.

To provide common functions to the drivers (e.g., initializing and diagnosing hardware components), a set of abstracted functions are provided by boot services. The boot services provide functions that are commonly executed by the drivers, but are available in the boot services so that each function does not need to be included with each driver. The boot services are generally stored in the system firmware and are loaded into memory early in the boot mode. When one of the drivers needs to perform one of the common functions available in the boot services, the driver makes the call to the boot services that execute any necessary instructions.

Once the processor system completes the boot process, control of the processor system is handed to the OS. When the processor system moves from the boot mode to the OS mode, the boot services and any boot drivers that were loaded into memory may be deleted because the OS provides its own services and drivers. Deleting the boot services and boot drivers frees the system memory for use by the applications, drivers, and services of the OS.

The OS mode refers to the time during which the OS controls the processor system. The OS is a software system that provides control and management of hardware, system operations, and applications that may be run on the processor system. Example OSs include Windows, Unix, Linux, OS-X, etc. The OS provides its own set of drivers and services to communicate with and control the hardware components of the processor system.

OS agnostic mode refers to an operating mode that the processor system enters to perform a specified function, such as, for example, to attempt to reinitialize a hardware component after a failure has been detected. Examples of OS agnostic modes are system management mode (SMM) and platform management mode. The processor system may switch to the OS agnostic mode from the boot mode or the OS mode when a hardware or software interrupt is made by the processor system. For example, a hardware failure may cause the system to switch from the OS mode to the OS agnostic mode to reinitialize the hardware before returning to the OS mode. During OS agnostic mode, like the boot mode, the processor system is controlled by firmware instructions. To allow the firmware instructions to communicate with hardware components, a set of OS agnostic drivers is included with the processor system. To provide functionality to these drivers, a set of abstracted functions is provided by the OS agnostic core. The OS agnostic core, like the boot services, provides common functions to the drivers for managing hardware components so that the functionality does not need to be included in each driver.

The OS agnostic core differs from and includes different limitations than the boot services. Thus, boot drivers must be configured to access the boot services and OS agnostic drivers must be configured to access the OS agnostic core. Accordingly, the same drivers cannot be used during the OS agnostic mode and the boot mode. In other words, the boot mode and the OS agnostic mode cannot share drivers, and therefore, the processor system must include two copies of each of the drivers. This results in duplication of code, increased memory requirements, increased development costs, and the need to update two drivers whenever a change must be made.

DETAILED DESCRIPTION

Figure 1:
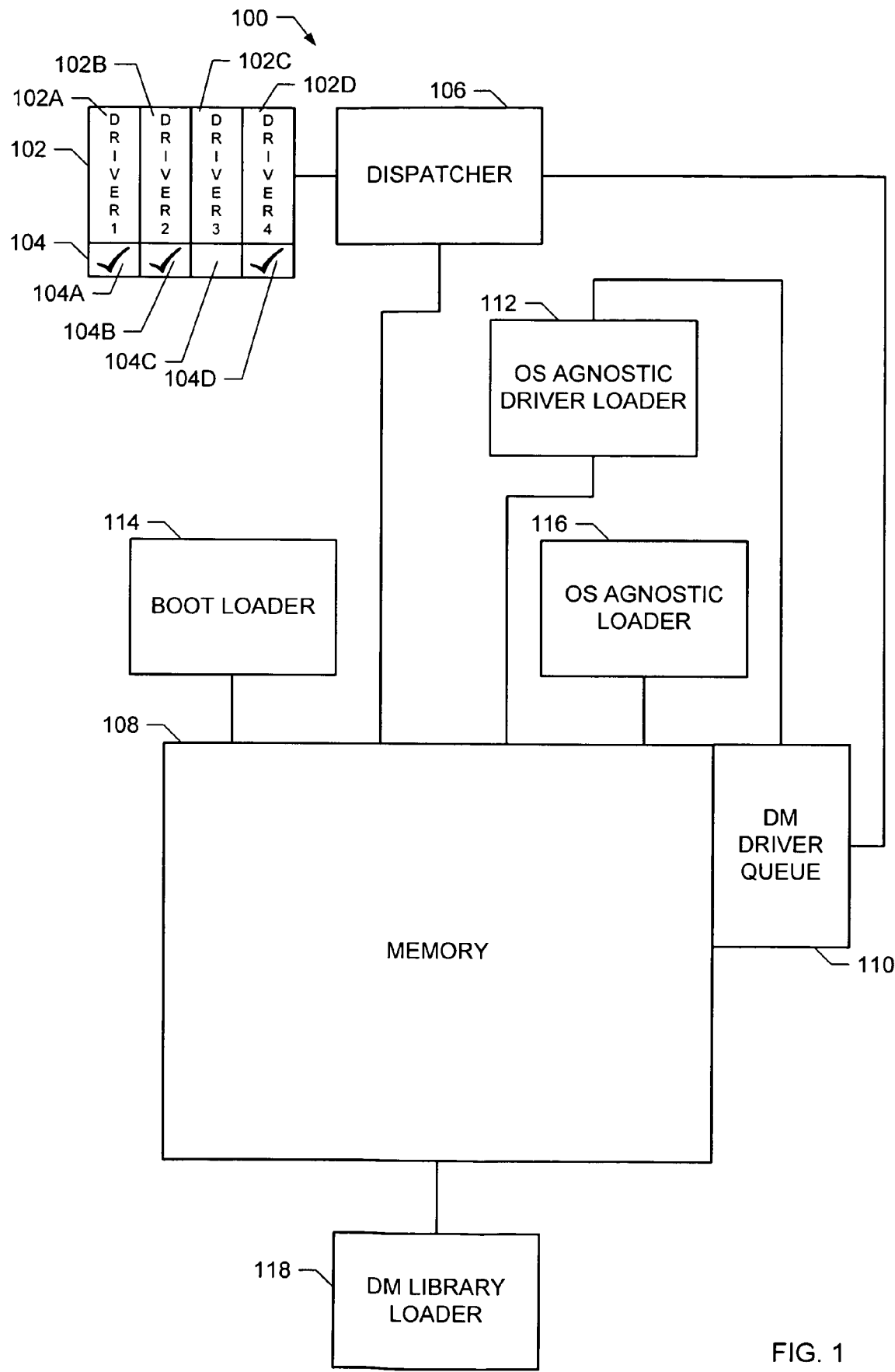
FIG. 1 is a block diagram of an example system for implementing dual-mode drivers.

A block diagram of an example system 100 for implementing dual-mode (DM) drivers is shown in FIG. 1. As described in detail below, the system 100 allows a single driver to be used during both a boot mode and an OS agnostic mode. The system 100 includes one or more drivers 102 (e.g., driver A 102A, driver B 102B, driver C 102C, driver D 102D), each of which includes a DM flag 104 (e.g., DM flag 104A; DM flag 104B; DM flag 104D, which are checked; and DM flag 104D, which is not checked), a dispatcher 106, an OS agnostic driver loader 112, a boot loader 114, an OS agnostic loader 116, and a DM library loader 118. According to one example, these components may be implemented using software instructions that execute on a processor system 900, shown in FIG. 9. The system 100 of FIG. 1 also includes a memory 108 and a DM driver queue 110, which are implemented using system memory, such as system memory 904 shown in FIG. 9.

Of course, it should be understood that any of the software may be implemented as discrete hardware components and any of the hardware components may be implemented as software in alternative implementations. Additionally, alternate examples of the system 100 may include multiple instances of some components and/or no instances of some components. For example, there may be more or less than the four drivers 102 shown in FIG. 1 and/or if all drivers are DM capable, the DM flag 104 and the DM driver queue 110 may not be necessary.

In one example, the drivers 102 are software instructions that allow the processor system 900 to communicate with connected hardware components (e.g., hard drive, keyboard, mouse, etc.) The drivers 102 may be stored in any type of system memory that is available in the processor system. For example, the drivers 102 may be stored in flash memory (e.g., flash memory 910 of FIG. 9), RAM (e.g., RAM 906 of FIG. 9), ROM (e.g., ROM 908 of FIG. 9), or any other type of storage. The drivers 102 are configured so that they are not only capable of utilizing boot services that are available during the boot mode, but are additionally capable of utilizing OS agnostic services that are available during the OS agnostic mode. Thus, only one set of drivers needs to be stored in the system memory 904, because that same set of drivers is capable of being used during the boot mode and the OS agnostic mode when OS agnostic services are present. The OS agnostic services are described in further detail herein.

A processor system 900 may include some drivers that are capable of operating in both boot mode and OS agnostic mode and some drivers that are not. Accordingly each of the drivers 102 may additionally include a DM flag 104 (e.g., DM flag 104A; DM flag 104B; DM flag 104D, which is set to indicate that the corresponding drivers are DM capable; and DM flag 104C, which is cleared indicate that the corresponding driver 102C is not DM capable). In other words, the DM flag 104 indicates whether the drivers can be bound to both boot services and OS agnostic services or only bound to one of the boot services and OS agnostic services. For example, the DM flag 104 may be a bit that is set for DM capable drivers and cleared for drivers that are not DM capable. Of course, the functionality of the DM flag 104 may be accomplished by any other method of indicating which of the drivers 102 are DM capable, such as, for example a number of bits or bytes.

In one example, the dispatcher 106 is a software component executed by the processor system 900 to load and process the drivers 102. In operation, and as described in further detail below, the dispatcher 106 loads a copy of the drivers 102 into a portion of the memory 108 that is set aside for the boot mode. The dispatcher 106 checks the DM flag 104 or uses any other available method to determine whether each of the drivers 102 is DM capable. For each driver 102 (e.g., 102A, 102B, and 102D) that is DM capable, a notification is placed in the DM driver queue 110. The DM driver queue 110 is any type of memory that is capable of storing a list of drivers that are DM capable.

According to one disclosed example, the OS agnostic driver loader 112 is a software component executed by the processor system 900 to monitor the DM driver queue 110 for drivers 102 that are DM capable. As described below in detail, the OS agnostic driver loader 112 may additionally check whether the DM flag 104 is set to determine which drivers are DM capable. For each of the drivers 102 that are DM capable, the OS agnostic driver loader 112 places a copy of the driver in a portion of the memory 108 that is set aside for the OS agnostic mode. After a driver is loaded into the memory 108, the OS agnostic driver loader 112 may remove the notification for that driver from the DM driver queue 110.

The boot loader 114 may be implemented using software that is executed by the processor system 900 to load boot services 302 into the memory 108. The boot loader 114 loads the boot services 302 into a part of the memory 108 that is set aside for the boot mode. The boot loader 114 may additionally be embodied as a discrete hardware component and is well known to those with ordinary skill in the art.

In one example, the OS agnostic loader 116 is a software component that is executed by the processor system 900 to load an OS agnostic core 502 and OS agnostic services 504 into the memory 108. The OS agnostic services 504 provide a set of abstract functions that may be substantially similar to the functions that are available from the boot services 302. The OS agnostic services 504 allow drivers 102 that are normally only capable of operating in conjunction with boot services to be available for usage when boot services 302 are no longer available. In other words, DM capable drivers can be bound to the OS agnostic services 504 when the processor system is operating in the OS agnostic mode. The OS agnostic services 504 may be a high level implementation of the OS agnostic core 502 that exists in current processor systems. In other words, a function that is available to the drivers 102 in the OS agnostic services 504 may execute several functions in the OS agnostic core 502 to facilitate the execution of a driver that is bound to the OS agnostic services 504. The OS agnostic loader 116 may alternatively be embodied in a discrete hardware component.

According to one example, the DM library loader 118 is a software component executed by the processor system 900 to load a DM library 602 (shown in FIG. 6) into the memory 108. The DM library 602 is capable of determining the current operating mode (e.g., boot mode or OS agnostic mode) of the processor system 900 binding the drivers 102 to the appropriate services (e.g., boot services 302 or OS agnostic services 504) accordingly. For example, if the DM library 602 determines that the processor system 900 is operating in boot mode, the DM library 602 binds the drivers 102 to the boot services 302. Conversely, if the DM library 602 determines that the processor system 900 is operating in OS agnostic mode, the DM library 602 binds the drivers 102 to the OS agnostic services 502. Of course, one of ordinary skill in the art will recognize that the functionality of the DM library may be included with the drivers 102. The driver 102 may determine the current operating mode of the processor system 900 and bind themselves to the proper services accordingly. In that case, the DM library loader 118 would not be necessary and may be eliminated from the system.

Figure 2:
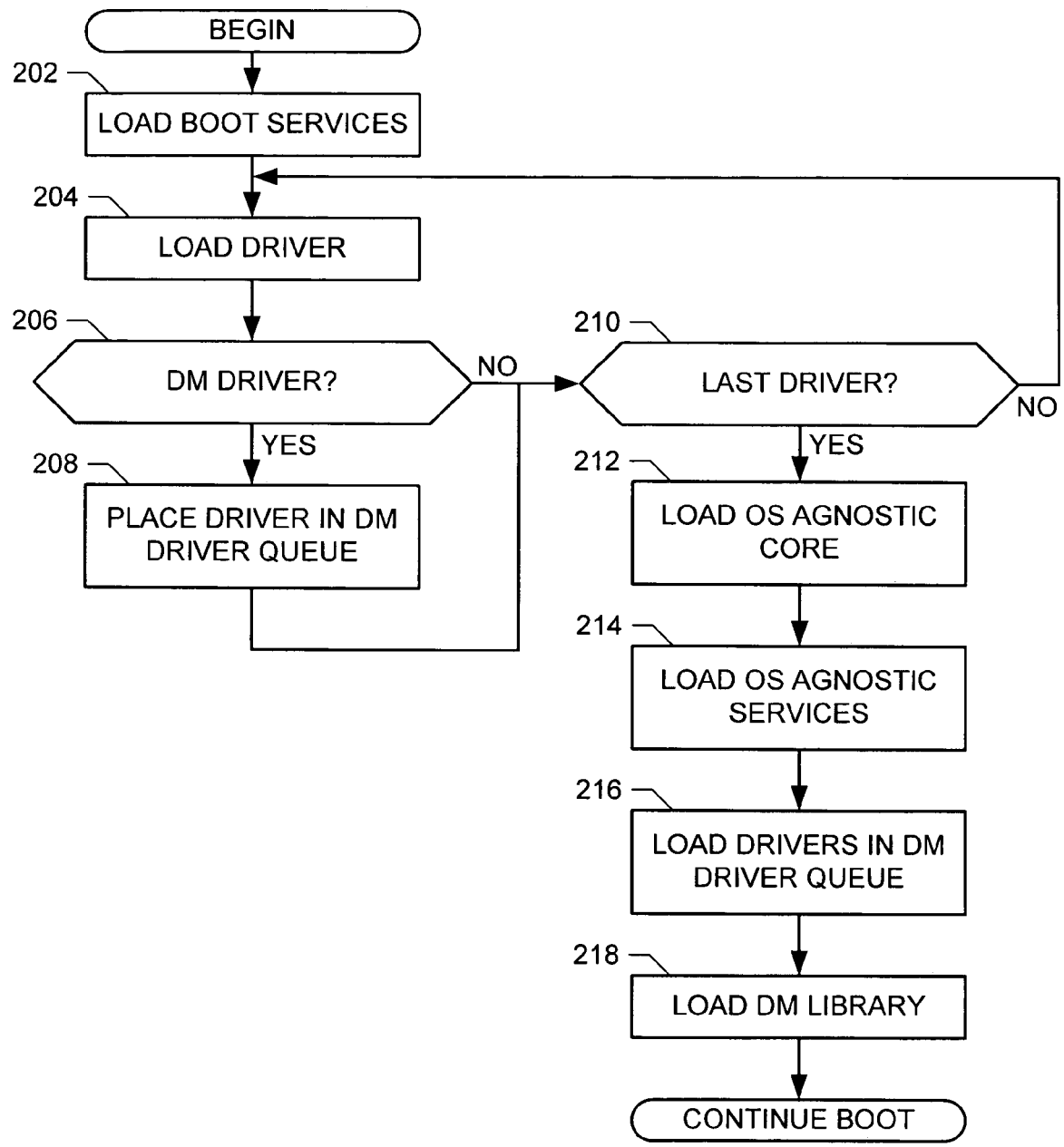
FIG. 2 is an example flow diagram of the boot operating mode for the example system of FIG. 1.
Figure 3:
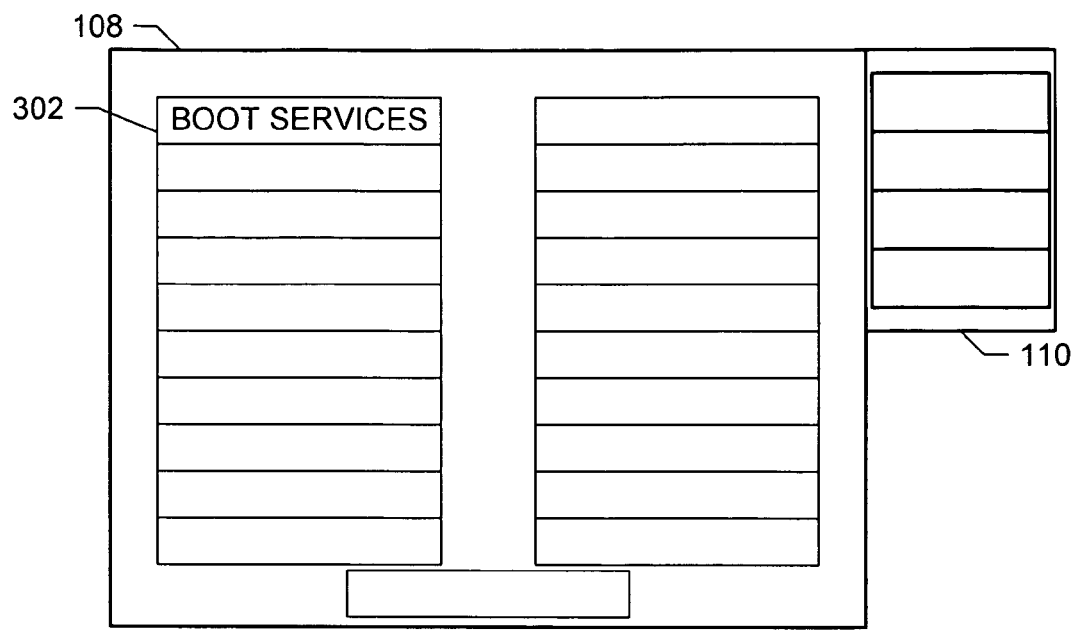
FIGS. 3-6 are block diagrams illustrating the states of the memory as the blocks of FIG. 2 are executed.

FIG. 2 is an example flow diagram of a boot process 200 that may be carried out by the example system 100 of FIG. 1. The operation of the boot process 200 is now explained in conjunction with FIGS. 3-7. On startup of the system 100, the boot services 302 (shown in FIG. 3) are loaded into the memory 108 by the boot loader 114 (block 202). Once the boot services 302 are loaded into memory 108, they may be accessed when necessary.

Figure 4:
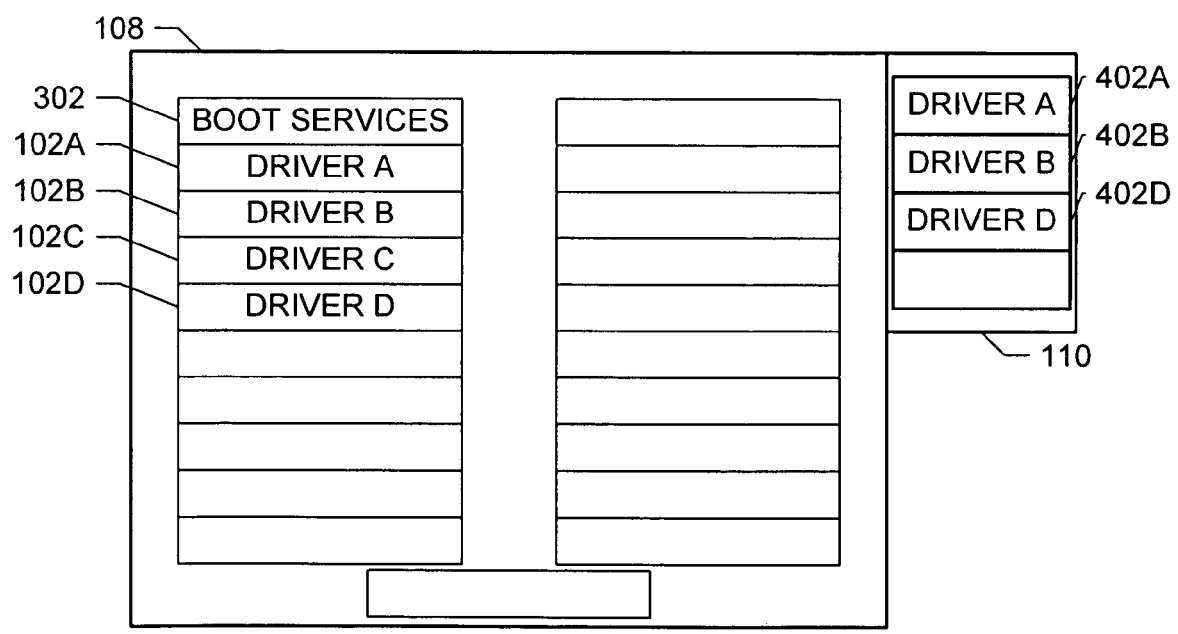

After the boot services 302 are loaded, one of the drivers 102 (e.g., driver 102A) is loaded from the system storage and placed into the memory 108 (block 204). The driver 102A is then processed to determine if it is DM capable (block 206). If the driver 102A is DM capable, a notification 402A for the driver 102A is placed in the DM driver queue 110 (block 208). Then the processor system 900 checks to see if the last of the drivers 102 has been loaded (block 210). If there are more of the drivers 102 (e.g., 102B, 102C, 102D) to be loaded control returns to block 204. In the example system drivers 102A, 102B, and 102D are DM capable as is indicated by their set of DM flags 104A, 104B, and 104D. Example driver 102C is not DM capable as indicated by the cleared DM flag 104C and, thus, a notification is not placed into the DM driver queue for driver 102C. FIG. 4 shows the state of the memory 108 after the last of the drivers 102 has been loaded.

Figure 5:
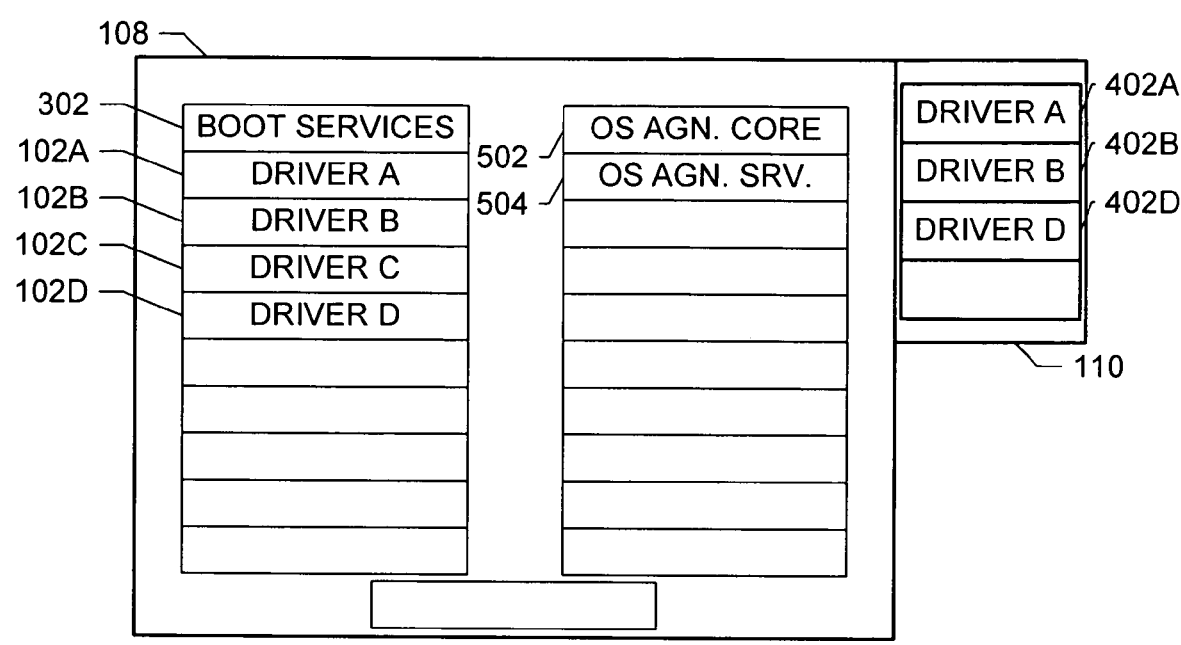

As shown in the flow diagram of FIG. 2, after the last driver has been loaded, the OS agnostic loader 116 loads the OS agnostic core 502 into to the portion of the memory 108 that is for the OS agnostic mode (block 212). Then, the OS agnostic loader 116 loads the OS agnostic services 504 into the portion of the memory 108 that is for the OS agnostic mode (block 214). FIG. 5 shows the state of the memory 108 after block 214 is completed.

Figure 6:
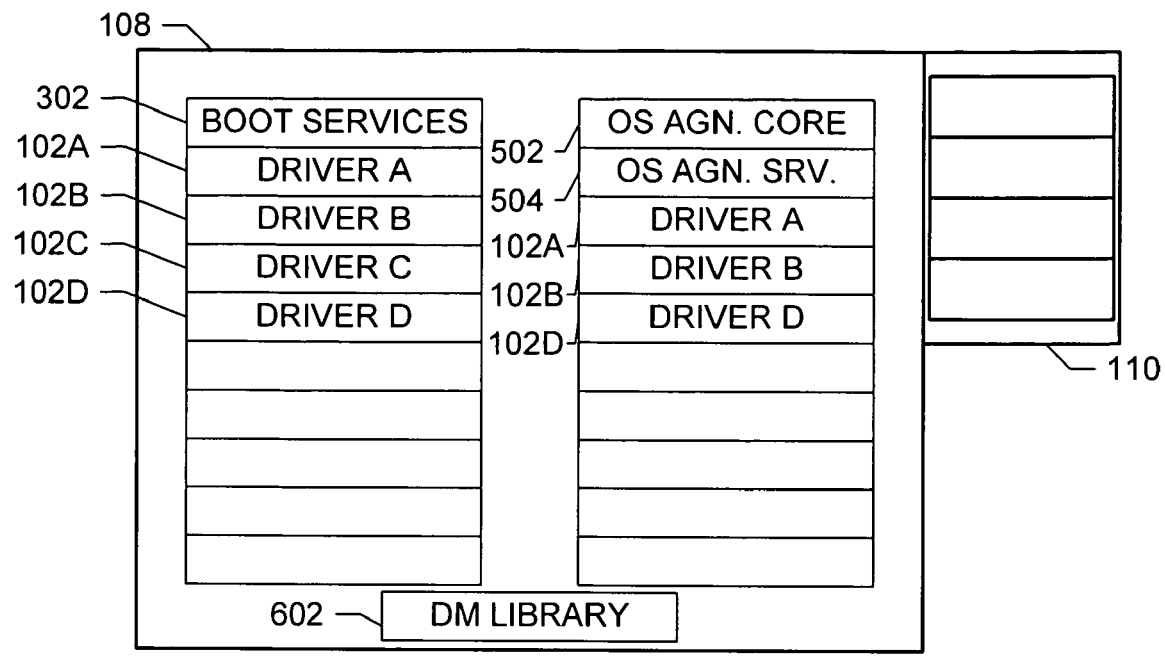

After the OS agnostic core 502 and OS agnostic services 504 are loaded into the memory 108, the OS agnostic driver loader 112 loads the drivers 102A, 102B, 102D that are referenced by the notifications 402A, 402B, and 402D in the DM driver queue 110 into the memory 108 (block 216). Once the drivers 102A, 102B, and 102D are loaded into the memory 108, the OS agnostic driver loader 112 removes the notifications 402A, 402B, and 402D from the DM driver queue 110. Then, the DM library loader 118 loads the DM library 602 into the memory 108 (block 218). FIG. 6 shows the state of the memory 108 after block 218 is completed.

Figure 7:
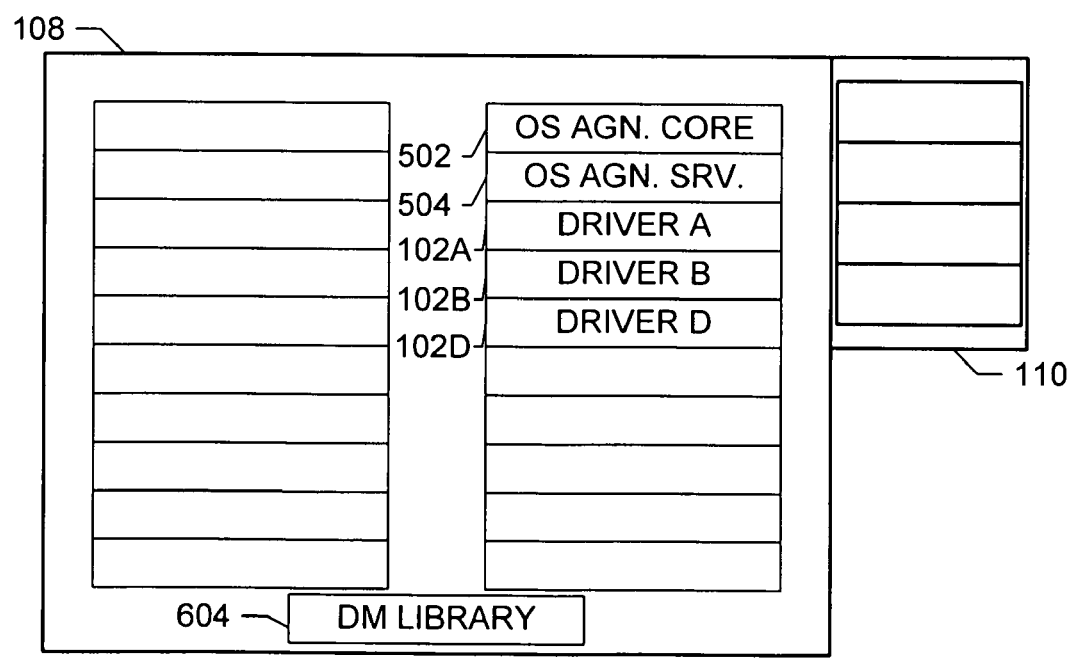
FIG. 7 is a block diagram that illustrates the state of memory after the processor system has moved from the boot operating mode to the OS operating mode.

After the DM library 602 is loaded, the computer continues booting according to its boot instructions. After the entire boot process 200 has completed, the OS boot loader takes control of the processor system 900 to load the OS. At this time, the boot operating mode is complete and the boot services 302 and drivers 102 in memory for the boot operating mode are deleted. FIG. 7 illustrates the state of the memory 108 once the processor system 900 has moved from the boot operating mode to the OS operating mode. FIG. 7 does not show any of the services or drivers associated with the OS that are loaded into memory following the transition from the boot mode to the OS mode.

Figure 8:
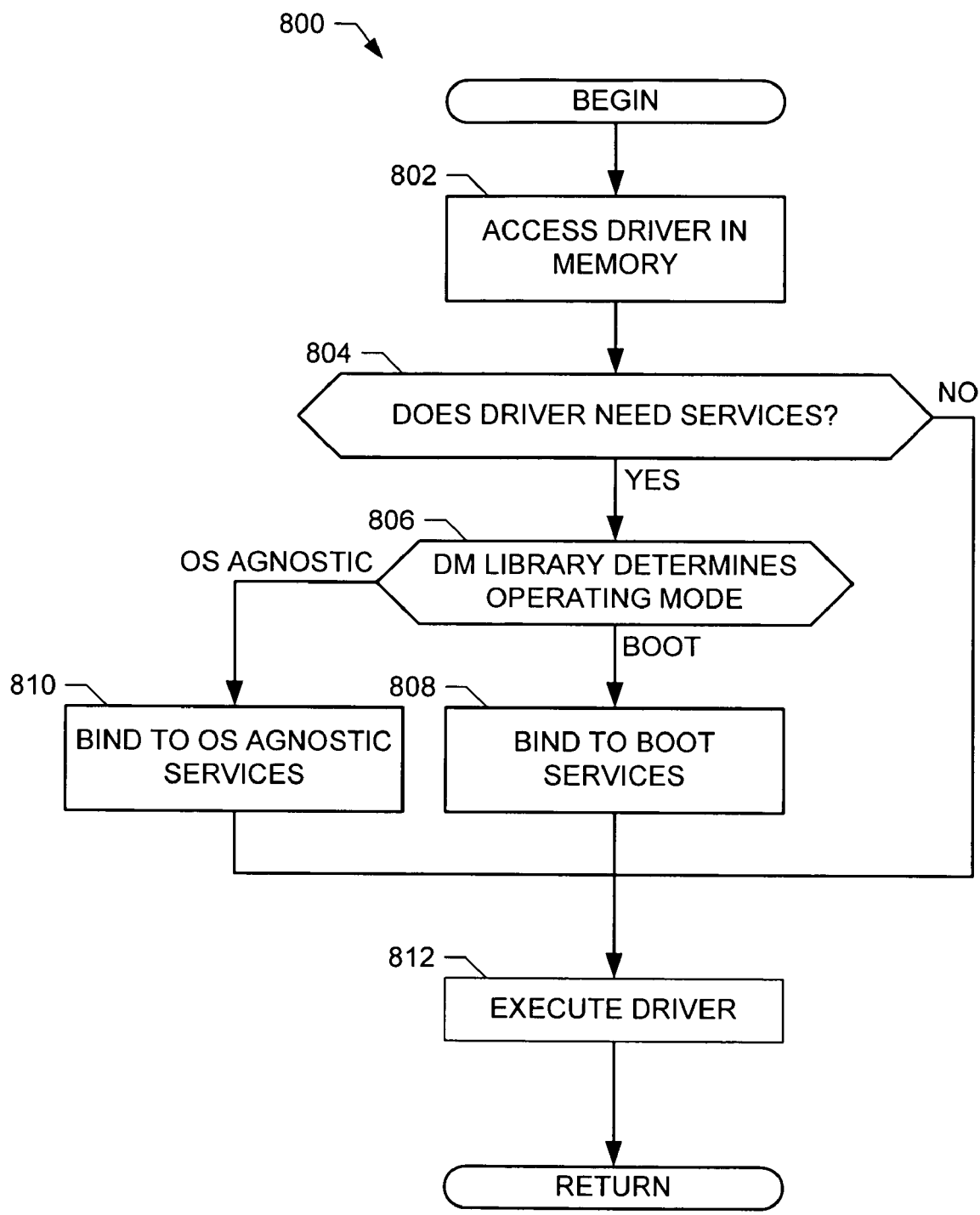
FIG. 8 is an example flow diagram of a process for executing one of the drivers of FIG. 6.

FIG. 8 is an example flow diagram of the process 800 for executing one of the drivers 102 (e.g., 102A). The process 800 begins by accessing the driver 102A in the memory 108. The driver 102A is accessed in the portion of the memory 108 that corresponds to the current operating mode of the processor system. For example, if the processor system 900 is in the OS agnostic mode, the driver 102A will be accessed in the portion of the memory 108 that is set aside for the OS agnostic mode. Conversely, if the processor system 900 is currently in the boot mode, the driver 102A will be accessed in the portion of the memory 108 that is set aside for the boot mode.

After the driver 102A is accessed in the memory 108, the processor system 900 may check to determine if the driver 102A requires the use of any services (block 804). If no services are required, control proceeds to block 812 for execution of the driver 102A. If any services are required by the driver 102A, the DM library 602 is accessed to determine the current operating mode of the processor system 900 (block 806). If the processor system 900 is in the boot mode, the DM library 602 binds the driver 102A to the boot services 302 (block 808). If the processor system 900 is in the OS agnostic mode, the DM library 602 binds the one of the drivers 102 to the OS agnostic services 504 (block 810).

After the drivers are bound to the appropriate services, the instructions of the driver 102A are executed (block 812). The instructions of the driver 102A may make calls to the functions of the services (e.g., boot services 302 or OS agnostic services 504) as necessary. Once the execution of the instructions of the driver 102A is complete, the processor system 900 continues with its normal operation.

Of course, one of ordinary skill in the art will recognize that the system may not check if the drivers 102 require services and may bind the drivers 102 to the appropriate services regardless. Additionally, the system may use other methods for determining the appropriate services with which to bind the drivers 102. For example, the drivers 102 may include a flag that is modified by the OS agnostic driver loader 112 when the drivers 102 are loaded into the memory 108 that indicates that the drivers 102 will be used in the OS agnostic mode.

Figure 9:
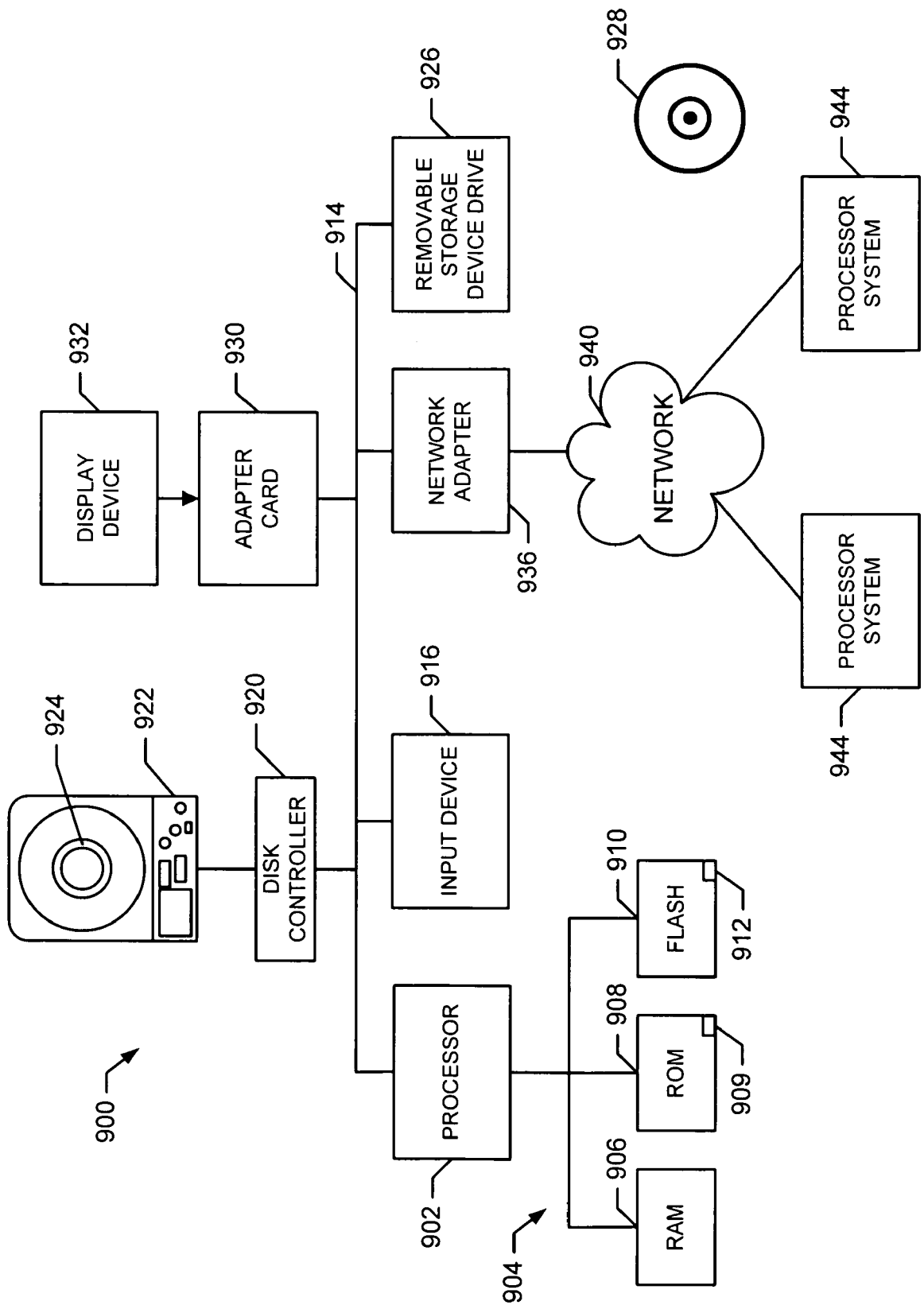
FIG. 9 is a diagram of an example processor system on which the foregoing processes may be implemented.

Turning now to FIG. 9, an example processor system 900 includes a processor 902, having associated system memory 904. The system memory 904 may include one or more of a random access memory (RAM) 906, a read only memory (ROM) 908 and a flash memory 910. The ROM 908 and the flash memory 910 of the illustrated example may respectively include boot blocks 909 and 912.

The processor 902, in the example of FIG. 9, is coupled to an interface, such as a bus 914 to which other peripherals or devices are interfaced. In the illustrated example, the peripherals interfaced to the bus 914 include an input device 916, a disk controller 920 communicatively coupled to a mass storage device 922 (i.e., hard disk drive) having a host protected area 924, and a removable storage device drive 926. The removable storage device drive 926 may include associated removable storage media 928, such as magnetic or optical media.

The example processor system 900 of FIG. 9 also includes an adapter card 930, which is a peripheral coupled to the bus 914 and further coupled to a display device 932.

The example processor system 900 may be, for example, a conventional desktop personal computer, a notebook computer, a workstation or any other computing device. The processor 902 may be any type of processing unit, such as a microprocessor from the Intel® Pentium® family of microprocessors, the Intel® Itanium® family of microprocessors, and/or the Intel XScale® family of processors.

The memories 906, 908, and 910, which form some or all of the system memory 904, may be any suitable memory devices and may be sized to fit the storage demands of the system 900. The ROM 908, the flash memory 910, and the mass storage device 922 are non-volatile memories. Additionally, the mass storage device 922 may be, for example, any magnetic or optical media that is readable by the processor 902.

The input device 916 may be implemented by a keyboard, a mouse, a touch screen, a track pad or any other device that enables a user to provide information to the processor 902.

The display device 932 may be, for example, a liquid crystal display (LCD) monitor, a cathode ray tube (CRT) monitor, or any other suitable device that acts as an interface between the processor 902 and a user via the adapter card 930. The adapter card 930 is any device used to interface the display device 932 to the bus 914. Such cards are presently commercially available from, for example, Creative Labs and other like vendors.

The removable storage device drive 926 may be, for example, an optical drive, such as a compact disk-recordable (CD-R) drive, a compact disk-rewritable (CD-RW) drive, a digital versatile disk (DVD) drive or any other optical drive. It may alternatively be, for example, a magnetic media drive. The removable storage media 928 is complimentary to the removable storage device drive 926, inasmuch as the media 928 is selected to operate with the drive 926. For example, if the removable storage device drive 926 is an optical drive, the removable storage media 928 may be a CD-R disk, a CD-RW disk, a DVD disk or any other suitable optical disk. On the other hand, if the removable storage device drive 926 is a magnetic media device, the removable storage media 928 may be, for example, a diskette, or any other suitable magnetic storage media.

The example processor system 900 also includes a network adapter 936 (i.e., a processor peripheral), such as, for example, an Ethernet card or any other card that may be wired or wireless. The network adapter 936 provides network connectivity between the processor 902 and a network 940, which may be a local area network (LAN), a wide area network (WAN), the Internet, or any other suitable network. As shown in FIG. 9, further processor systems 944 may be coupled to the network 940, thereby providing for information exchange between the processor 902 and the processors of the processor systems 944.

Of course, one of ordinary skill in the art will recognize that the order, size, and proportions of the memory illustrated in the example systems may vary. For example, the user/hardware variable space may be sufficiently larger than the main firmware instructions space. Additionally, although the following discloses example systems including, among other components, software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the following describes example systems, persons of ordinary skill in the art will readily appreciate that the examples are not the only way to implement such systems.

What is claimed is:

1. A method of processing a dual mode driver in a processor system comprising:

copying a first set of instructions to implement first services from a first memory to a second memory;

copying the driver from the first memory to the second memory to create a first instance for use in a first operating mode; and copying the driver from the first memory to the second memory to create a second instance of the driver for use in a second operating mode; and copying a second set of instructions to implement second services from the first memory to the second memory;

accessing the second instance of the driver stored in the second memory;

binding the second instance of the driver stored in the second memory to the second services when the processor system is in the second operating mode; and executing the second instance of the driver.

2. The method as defined in claim 1 further comprising:

copying a dual-mode library configured to determine an operating mode of the processor system from the first memory to the second memory; and using the dual-mode library to determine the current operating mode of the processor system and to bind the second instance of the driver to the second services according to the current operating mode of the processor system.

3. The method as defined in claim 1 wherein the second instance of the driver is further configured to determine a current operating mode of the processor system and bind the driver to the second set of services when the processor system is operating in the second operating mode.

4. The method as defined in claim 1 wherein the first operating mode is a boot mode or a pre-operating system mode and the second operating mode is an OS agnostic mode, a system management mode, or a power management mode.

5. The method as defined in claim 1 wherein copying of the driver further comprises:

checking the driver to determine if the driver is configured to function in two different operating modes; and placing a notification in a queue if the driver is configured to function in two different operating modes.

6. A computer readable medium storing machine readable instructions for processing a dual mode driver in a processor system that, when executed, cause a machine to:

copy a first set of instructions to implement first services from a first memory to a second memory;

copy the driver from the first memory to a first portion of the second memory to create a first instance for use in a first operating mode; and copy the driver from the first memory to a second portion of the second memory to create a second instance for use in a second operating mode;

copy a second set of instructions for implementing second services from the first memory to the second memory;

access the second instance of the driver stored in the second memory;

bind the second instance of the driver stored in the second memory to the second services when the processor system is in the second operating mode; and execute the second instance of the driver.

7. The computer readable medium as defined in claim 6 wherein the machine readable instructions further cause the machine to:

copy a dual-mode library configured to determine an operating mode of the processor system from the first memory to the second memory; and use the dual-mode library to determine the current operating mode of the processor system and bind one the second instance of the driver to the second services according to the current operating mode of the processor system.

8. The computer readable medium as defined in claim 6 wherein the second instance of the driver is further configured to determine a current operating mode of the processor system and the machine readable instructions further cause the machine to bind the driver to the second set of services when the processor system is operating in the second operating mode.

9. The computer readable medium as defined in claim 6 wherein the first operating mode is a boot mode or a pre-operating system mode and the second operating mode is an OS agnostic mode, a system management mode, or a power management mode.

10. The computer readable medium as defined in claim 6 wherein the machine readable instructions further cause the machine to:

check the driver to determine if the driver is configured to function in two different operating modes; and place a notification in a queue if the driver is configured to function in two different operating modes.

11. An apparatus to process a dual mode driver in a processor system comprising:
- a boot loader configured to copy a first set of instructions for implementing first services from a first memory to a second memory;
- a dispatcher configured to copy the driver from the first memory to a first portion of the second memory to create a first instance for use in a first operating mode; and
- an OS agnostic driver loader configured to copy the driver from the first memory to a second portion of the second memory to create a second instance of the driver for use in a second operating mode;
- an OS agnostic loader configured to copy a second set of instructions for implementing second services from the first memory to the second memory
- a processor configured to:
- access the second instance of the driver stored in the second memory;
- bind the second instance of the driver stored in the second memory to the second services when the processor system is in the second operating mode; and
- execute the second instance of the driver.

12. The apparatus as defined in claim 11 further comprising:
- a dual-mode library loader configured to copy a dual-mode library configured to determine an operating mode of the processor system from the first memory to the second memory.

13. The apparatus as defined in claim 11 wherein the second instance of the driver is further configured to determine a current operating mode of the processor system and the processor is configured to bind the driver to the second set of services when the driver indicates that the processor system is operating in the second operating mode.

14. The apparatus as defined in claim 11 wherein the first operating mode is a boot mode or a pre-operating system mode and the second operating mode is an OS agnostic mode, a system management mode, or a power management mode.

15. The apparatus as defined in claim 11 wherein the dispatcher is further configured to:
- check the driver to determine if the driver is configured to function in two different operating modes; and
- place a notification in a dual-mode notification queue for each of the drivers that are configured to function in two different operating modes.

* * * * *